Patented Sept. 26, 1933

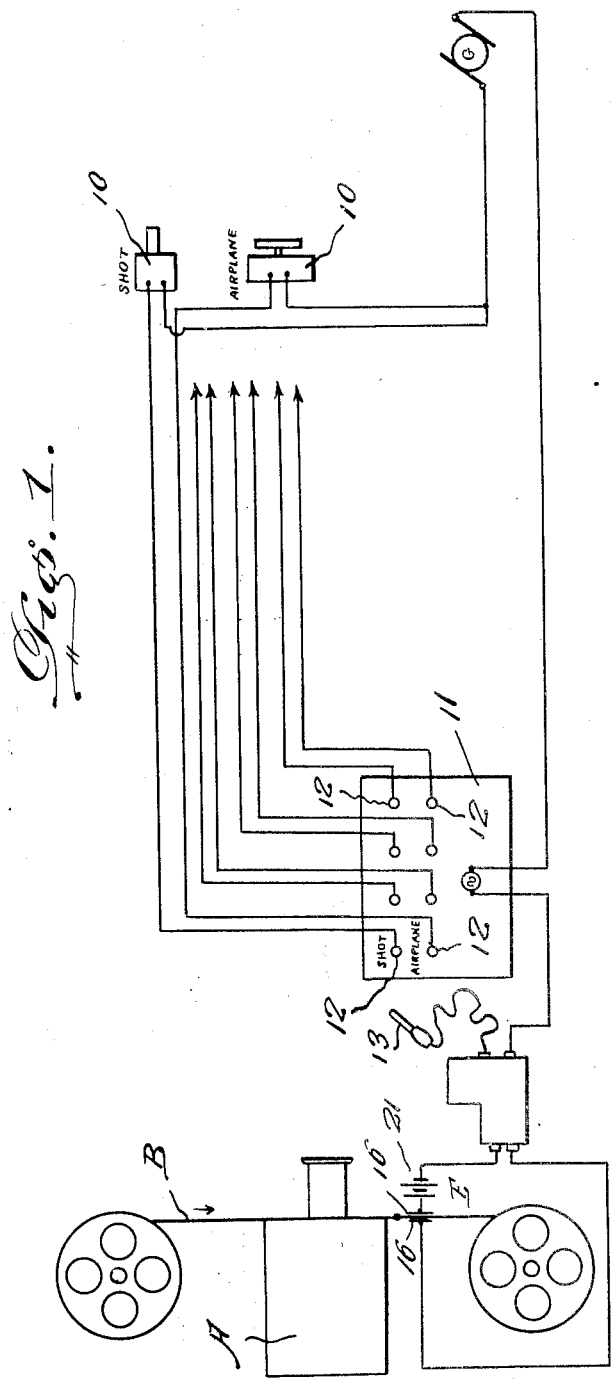

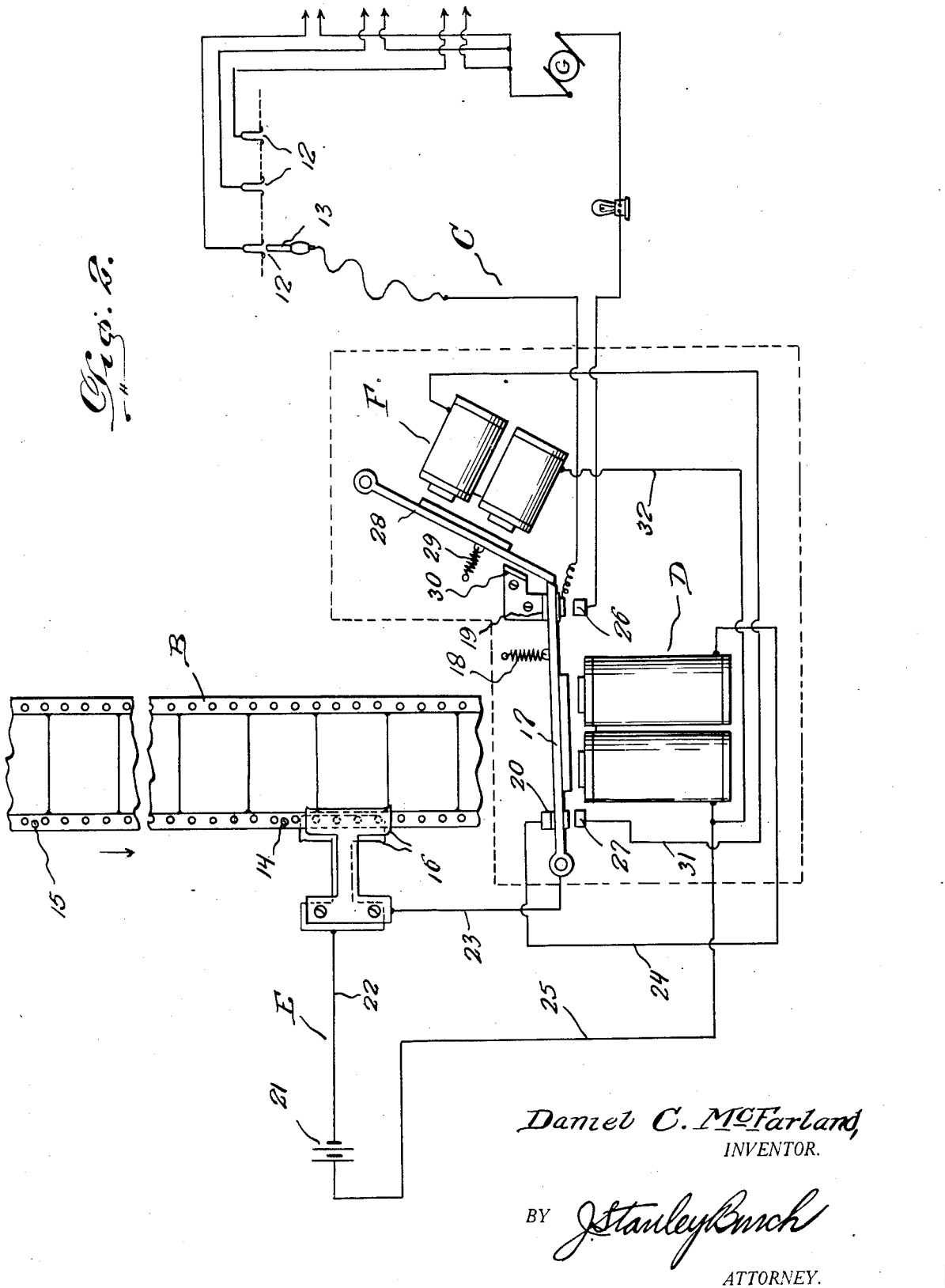

1,928,183

UNITED STATES PATENT OFFICE 1,928,183

MOVING PICTURE APPARATUS

Daniel C. McFarland, Norfolk, Va.

Application July 8, 1930. Serial No. 466,563

6 Claims. (Cl. 88—16.2)

The present invention relates to moving picture machines, and more particularly to means for producing various kinds of sounds, each of which is particularly associated with a scene or visual impression transmitted from the film, and produced concurrently with the projection of said scene or impression from the latter.

It is an object of the prseent invention to provide a plurality of electrically operated devices for producing relatively different sounds in conjunction with the projection of scenes or visual impressions from the film, and to selectively operate said devices concurrently with the transmission of a particular scene or visual impression from the film, and thereby render the picture produced more realistic to the observer and with a resultant increased interest.

In carrying out the invention I contemplate an apparatus for producing sounds in conjunction with the moving film of the picture machine, whereby a particular sound is produced concurrently with the transmission of a particular scene from the film, the apparatus being automatic in its operation with regard to both the starting and stopping of the particular sound producing device employed, and the stopping of said sound at the completion of the particular scene with which it is used.

A further object of the invention resides in the use of a plurality of sound producing devices included in a circuit of relatively high voltage, which circuit is automatically closed and opened by an electro-magnet which is initially energized by a relatively low voltage circuit controlled by the movements of the film of the motion picture machine.

In accordance with the present invention I also comprehend the provision of a novel construction of means for maintaining the electro-magnet operative and the high voltage circuit closed while the particular scene or visual impression is being transmitted from the film, and also effect a release of the electro-magnet to break the circuit at the completion of the particular scene or impression transmitted from the film, and in conjunction with which the sound producing devices can be singly and selectively employed.

The nature and advantages of the inventior will be better understood when the following detail description is read in connection with the accompanying drawings, the invention residing in the construction, combination and arrangement of parts as claimed.

In the drawings forming part of this application like numerals of reference indicate similar parts in the several views and wherein:

Figure 1 is a diagrammatic view.

Figure 2 is a similar view showing the construction and the arrangement of the component parts of the apparatus and how the film is used to automatically control the same.

Figure 3 is a sectional view through the film illustrating how it is used to electrically control or operate the apparatus.

Referring to the drawings in detail A indicates generally a motion picture machine of any ordinary well known construction, the film for which is indicated at B.

The apparatus forming the subject matter of the present invention embodies a plurality of sound producing devices 10 arranged in a circuit of relatively high voltage and indicated generally at C. At this time it is desired to be stated that any number of sound producing devices can be used in conjunction with a single machine, with the devices constructed to produce sounds of relatively different characters, and adapted to be singly and selectively employed in conjunction with a particular scene or visual impression transmitted from the film B incident to the operation of the machine A. For this purpose a switch board 11 is included in the circuit C and provided with a plurality of sockets 12 adapted to singly receive the usual plug 13, so that any particular sound producing device 10 can be connected in the circuit C for the purpose above stated. While I have illustrated two of such sound producing devices in Figure 1, I have also illustrated how other sound producing devices can be electrically connected with the switch board 11, and the invention is therefore not restricted to the number or the particular character of sound producing devices used.

The apparatus in its entirety is automatically controlled by the movement of the film B, which is provided with spaced contacts 14 and 15 respectively. Any number of contacts may be arranged upon the film, depending of course upon the particular production to be produced by the same, and the number of scenes included in the production which would require the operation of a particular sound producing device to render the picture more realistic and interesting to the observer. Irrespective of the number of contacts carried by the film B, there are two of such contacts used in conjunction with each scene or visual impression to be transmitted therefrom, and in conjunction with which a sound producing device is employed. Consequently these contacts 14 and 15 for each of such scenes are arranged upon the film B at suitably spaced points, namely at the beginning and ending of the scene on the film. The film passes between a pair of elongated stationary contacts 16, and when the contact 14 of the film engages the fixed contacts 16, a circuit of relatively low voltage is closed to energize or operate an electro-magnet indicated generally at D, and utilized to make and break the high voltage circuit C for the sound producing devices 10.

The movable contact element 17 of the electro-magnet D is normally held in its inactive position by means of a coil spring 18, and the movement of the contact element 17 under the influence of this spring is limited by a stop 19. In the normal position of the contact element 17 it engages a fixed contact 20 so that when the contact 14 of the film engages the fixed contacts 16 the magnet will be immediately energized. At this time, the current flows from its source 21 through the wire 22 to the contacts 16, thence through the wire 23 to the contact 20, from where it passes through the wire 24 to the electro-magnet, energizing the latter, and thence returns through the wire 25 to its source. Manifestly when the magnet D is energized, the movable contact element 17 thereof is attracted and moved into engagement with a pair of fixed contacts 26 and 27 respectively, the former being included in the high voltage circuit C as illustrated. The contact 14 is therefore employed to close the low voltage circuit E, and initially energize and operate the electro-magnet D, and just as soon as this is accomplished, the contact 14, incident to the movement of the film B passes beyond the contacts 16, thereby breaking the low voltage circuit E.

However, the high voltage circuit C has now been closed through the instrumentality of the electro-magnet D, so that any of the sound producing devices 10 can be singly and selectively operated from the switch board 11.

For the purpose of holding the electro-magnet operative, and the high voltage circuit closed until the particular scene or visual impression being produced is completed, I employ what I term a release magnet indicated generally at F, the movable contact of which is indicated at 28 and normally held in an inactive position under the influence of a coil spring 29. In this position the contact element 28 bears against the adjacent end of the contact element 17 of the electro-magnet D, but when the latter is energized, and the contact element 17 thereof moved into engagement with the contact 26, the contact element 28 of the magnet F under the influence of the spring 29 is shifted into engagement with a stop 30, and to a position to rest upon the contact 17 and thereby hold the electro-magnet D electrically connected in the high voltage circuit C. Consequently the circuit C is maintained closed until that portion of the film B, between the contacts 14 and 15 passes before the projecting lens of the machine, or in other words until the particular scene being produced is completed, so that during that time the sound producing devices 10 can be singly and selectively operated as the occasion may require.

Manifestly, when the scene is completed the contact 15 of the film B has been brought into engagement with the fixed contacts 16, there again closing the low voltage circuit E to energize the release magnet F. When the low voltage circuit is closed by the contact 15, the current flows from its source 21 through the contacts 16 and wire 23 to the contact 27, which is engaged by the contact 17 of the electro-magnet D. The current then passes through the wire 31 to the magnet F, energizing the latter and attracting the contact element 28 thereof, thereby moving the contact element 28 away from the contact element 17 of the electro-magnet D. Of course, when the contact element 17 is released from the contact element 28, it is shifted to its normal inactive position under the influence of the spring 18, and thereby breaks the circuit C to the sound producing devices. The low voltage current flowing through the wire 31 passes through the magnet F and is returned to its source through the wire 32.

The apparatus may be arranged at any point remote from the motion picture machine, and the switch board operated by an attendant who is supplied with a chart indicating just when and what particular sound device is to be operated incident to the operation of the film B. For instance, during the production of a picture, should a scene be projected upon the screen wherein a piston or other firearm is discharged, the attendant for the switch board, at the beginning of this scene, would insert the plug 12 into the socket electrically connected with the particular sound producing device used in this connection, and actuated to produce a sound similar to the firing of a shot. Again, should the production include a scene making use of aeroplanes in motion, the attendant of the switch board 11 would at the proper time electrically connect in circuit, the particular sound producing device, which when actuated produces a sound of an aeroplane motor. Manifestly if the sound producing device was used to simulate the firing of a shot, the contacts 14 and 15 carried by the film B would be very closely related, as the apparatus, or more particularly the high voltage circuit C is automatically closed and opened by these contacts at the beginning and completion of a particular scene transmitted from the film. On the other hand should the sound or hum of an aeroplane motor be required in conjunction with a particular scene transmitted from the film, the contacts 14 and 15 would be spaced a greater distance apart, depending of course upon the time required to project the particular scene upon the screen. Furthermore, the high voltage circuit is controlled by a low voltage relay or circuit actuated by the film and thereby minimize damage to the film under any condition.

While it is believed that from the foregoing description, the nature and advantages of the invention will be readily apparent, I desire to have it understood, that I do not limit myself to what is herein shown and described and that such changes may be resorted to when desired as fall within the scope of what is claimed.

What is claimed is:

1. An apparatus for producing sounds in conjunction with a moving film of a motion picture machine, comprising a relatively high voltage circuit, a plurality of sound producing devices adapted to be singly and selectively connected in said circuit, a relatively low voltage circuit, an electro-magnet included in the low voltage circuit and having a movable armature provided with circuit closing means for said low voltage circuit when in retracted position, means controlled by said film for energizing said magnet to thereby attract said armature, a contact included in the high voltage circuit and engaged by said armature to close said high voltage circuit when the low voltage circuit is opened by said armature, and means including said low voltage circuit and controlled by said film for automatically breaking the high voltage circuit at a predetermined interval.

2. An apparatus for producing sounds in conjunction with a moving film of a motion picture machine, comprising a relatively high voltage circuit, a plurality of sound producing devices adapted to be singly and selectively connected in said circuit, an electro-magnet having a movable armature, a relatively low voltage circuit normally including said magnet and armature with the latter in retracted position, means controlled by said film for energizing said magnet through the low voltage circuit to thereby attract said armature, a contact included in the high voltage circuit and engaged by said armature to close said high voltage circuit when the low voltage circuit is opened, means operable subsequent to the opening of the low voltage circuit to hold the armature in circuit-closing position with the high voltage circuit, and means controlled by said film for automatically effecting a release of the armature at a predetermined interval.

3. An apparatus for producing sounds in conjunction with a moving film of a motion picture machine, comprising a relatively high voltage circuit, a plurality of sound producing devices adapted to be selectively connected in said circuit, an electro-magnet having a movable armature, a relatively low voltage circuit normally including said magnet and armature with the latter in retracted position, means controlled by said film for energizing said magnet through the low voltage circuit, to thereby attract said armature, a contact included in the high voltage circuit and engaged by said armature to close said high voltage circuit when the low voltage circuit is opened, means for maintaining said armature in circuit-closing position in the high voltage circuit subsequent to the opening of the low voltage circuit, a release magnet arranged in the low voltage circuit, and means controlled by the film for energizing said release magnet to effect a release of the armature at a predetermined interval.

4. An apparatus for producing sounds in conjunction with a moving film of a motion picture machine, comprising a sound producing device included in a normally open high voltage circuit, a low voltage circuit, a magnet having a movable armature normally included in the low voltage circuit, said armature being provided with circuit closing means for said low voltage circuit when in retracted position, means controlled by the film for closing the low voltage circuit to energize said magnet to thereby attract said armature, a contact included in the high voltage circuit and engaged by said armature to close said high voltage circuit when the low voltage circuit is opened, and means for connecting the sound producing device in its respective circuit.

5. An apparatus for producing sounds in conjunction with a moving film of a motion picture machine, comprising a plurality of electrically operated sound producing devices included in a normally open high voltage circuit, a low voltage circuit, a magnet having a movable armature normally included in the low voltage circuit, said armature being provided with circuit closing means for said low voltage circuit when in retracted position, means controlled by the film for closing the low voltage circuit to energize said magnet to thereby attract said armature, a contact included in the high voltage circuit and engaged by said armature to close said high voltage circuit when the low voltage circuit is opened, means for holding the armature in circuit-closing position with the high voltage circuit, and means controlled by the film to effect a release of said armature.

6. An apparatus for producing sounds in conjunction with a moving film of a motion picture machine, comprising a plurality of electrically operated sound producing devices included in a normally open high voltage circuit, a low voltage circuit, a magnet having a movable armature normally included in the low voltage circuit, said armature being provided with circuit closing means for said low voltage circuit when in retracted position, means controlled by the film for closing the low voltage circuit to energize said magnet to thereby attract said armature, a contact included in the high voltage circuit and engaged by said armature to close said high voltage circuit when the low voltage circuit is opened, means for selectively connecting the sound producing devices in said high voltage circuit, means for holding the armature in circuit-closing position with the high voltage circuit, and means controlled by the film and including a magnet energized through the low voltage circuit to effect a release of said armature.

DANIEL C. McFARLAND.